United States Patent [19]

Banker

[11] Patent Number: 4,523,228
[45] Date of Patent: Jun. 11, 1985

[54] SYNC SUPPRESSION SCRAMBLING OF TELEVISION SIGNALS FOR SUBSCRIPTION TV

[75] Inventor: Robert O. Banker, Cumming, Ga.

[73] Assignee: Scientific Atlanta Inc., Atlanta, Ga.

[21] Appl. No.: 466,698

[22] Filed: Feb. 15, 1983

[51] Int. Cl.³ .......................... H04N 7/16; H04K 1/04
[52] U.S. Cl. ...................................... 358/120; 358/122
[58] Field of Search ........................ 358/120, 122, 123

[56] References Cited

U.S. PATENT DOCUMENTS

| 4,336,553 | 6/1982 | den Toonder et al. | 358/120 |
| 4,390,898 | 6/1983 | Bond et al. | 358/120 |
| 4,396,946 | 8/1983 | Bond | 358/122 |
| 4,408,225 | 10/1983 | Ensinger et al. | 358/120 |
| 4,466,017 | 8/1984 | Banker | 358/120 |
| 4,471,380 | 9/1984 | Mobley | 358/120 |

Primary Examiner—S. C. Buczinski
Assistant Examiner—Linda J. Wallace
Attorney, Agent, or Firm—Martin LuKacher

[57] ABSTRACT

Sync suppressed television signals transmitted with timing pulses in dynamically variable time delayed relationship with respect to the suppressed sync pulses are descrambled with a high degree of noise immunity by decoding tag pulses transmitted with the timing pulses into a digital signal representing the dynamically variable time delay relationship in terms of the number of such tag pulses during a predetermined period of time during each field of the TV signal, into a digital signal. The decoding is carried out to provide the digital signal with different values for different groups, each containing a different number of tag pulses. The pulses which restore the sync pulses in the TV signal in each field are timed with respect to the timing pulses in accordance with the value of the digital signal. Dynamic delay variations which vary from field to field or for any selected number of fields, during any selected period of time, may be accommodated in the descrambling of the TV signals and with high noise immunity due to the use of groups of tagging pulses in the decoding of the dynamically varying delays.

12 Claims, 5 Drawing Figures

SYNC SUPPRESSION SCRAMBLING OF TELEVISION SIGNALS FOR SUBSCRIPTION TV

DESCRIPTION

The present invention relates to subscription TV systems in which TV signals are scrambled by suppressing the sync intervals thereof so that the TV signals are distorted when displayed except at authorized receiving stations which are equipped to descramble the signals, and more particularly to a sync suppression scrambling system wherein the TV signals are transmitted with dynamically varying time delays between the suppressed sync intervals and timing signals, the dynamically varying delays being represented by the encoding of delay control signals also transmitted with the TV signals.

The invention is especially suitable for use in the transmission of premium, subscription TV programs by cable systems. Features of the invention may also be applied to the transmission of premium TV by broadcast or in other networks such as in hotels, apartments, dormitories and other places of public accommodation.

A system for sync suppression scrambling of TV signals with timing pulses and suppressed sync intervals transmitted in dynamically variable time delay relationship is the subject matter of U.S. patent application Ser. No. 06/334,040, filed Dec. 23, 1981, now U.S. Pat. No. 4,466,017 in the name of Robert O. Banker. In the system provided by Banker and described in the above-identified application, timing pulses are transmitted with delay control signals modulated on the audio portion of the TV signal. The delay control signal represents which of a plurality of selected time delays exists between the timing signals and the suppressed sync intervals and is used to control the generation of pulses which are operative to restore the suppressed sync of the TV signals.

An improved system for dynamic delay control of sync suppression descrambling systems and dynamic decoding of delay code signals which provides a high degree of noise immunity is provided in accordance with this invention.

It is therefore an object of the present invention to provide an improved system of sync suppression scrambling of television signals.

It is a further object of the invention to provide an improved sync suppression scrambling system wherein timing signals for use in descrambling are transmitted with dynamically varying timing, which can be decoded with a high degree of noise immunity.

It is a still further object of the present invention to provide an improved sync suppression scrambling system with dynamically variable timing to enhance the security of the scrambling system and defeat unauthorized reception of premium, subscription signals.

Briefly described, the sync suppression scrambling system embodying the invention is a system in which TV signals are transmitted with the sync pulses thereof suppressed, together with timing pulses having a dynamically variable time delay relationship with the sync pulses and with delay control pulses which represent this time relationship. The system has means for restoring the suppressed sync pulses with restoring pulses. The system also has means for operating the restoring means to generate the restoring pulses at the proper time relationship with the timing pulses when the time relationship is dynamically varying by depending upon the number of delay control pulses which are detected in a given period of time, such as the time for transmission of a field or a portion of a field of the TV signal. The delay control pulses are preferably tag pulses which are transmitted serially with the timing pulses. The number of such tagging pulses in each field or a portion of each field represents the varying time relationship. The tag pulses are detected and decoded into a digital signal, the value of which changes with the number of tag pulses. The detection of different numbers of tag pulses results in a change in the value of the digital signal. Accordingly, a change of more than a single tag pulse in the number which is transmitted may be needed in order to change the value of the digital control signal, thereby enhancing the noise immunity of the system. The restoring pulses are generated with selected time delays, for example, four different time delays, depending upon the value of the digital signal. Descramblers which provide only a fixed time delay are inoperative to restore the sync pulses in many frames of the TV signals. The reception remains distorted, except when a descrambler operative to decode the tagging pulses and produce restoring pulses with the proper time delay as represented by the number of tag pulses transmitted, is used.

The foregoing and other objects, features and advantages of the invention as well as a presently preferred embodiment thereof, will be more apparent from a reading of the following description in connection with the accompanying drawings in which.

Figure 1:
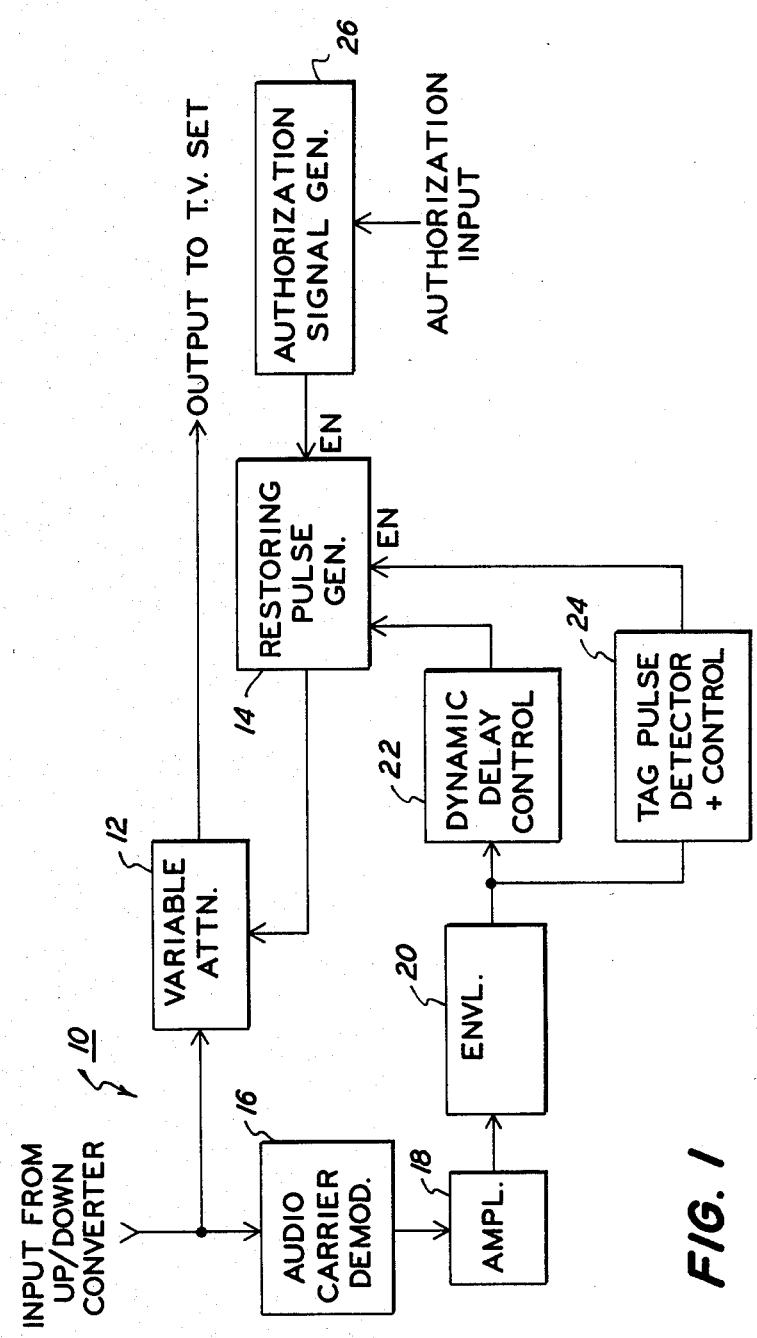
FIG. 1 is a block diagram of a descrambler of a scrambling system which embodies the system.

Referring more particularly to FIG. 1, there is shown the dynamic descrambler 10 of the system in which sync suppressed TV signals are transmitted, as from the head end of a cable system over cables to subscribers having their own TV sets. The horizontal and vertical sync intervals of the TV signals are suppressed, as by selective attenuation of the TV signals before transmission at the head end. Timing pulses are also transmitted with the TV signal on a pilot carrier of an unused cable channel or, and more preferably, by modulating the audio signals. The timing pulses, for example, are represented by amplitude modulation of the audio carrier of the TV signal. The time relationship between the timing pulses and the sync interval is dynamically variable in order to encrypt the transmission and prevent unauthorized subscribers from viewing premium subscription TV programs. The time delay between the timing pulses and the horizontal sync pulses may be dynamically varied from field to field. In standard television transmission, one scanning sequence of a raster of 262½ lines horizontally from left to right and vertically from top to bottom of the screen constitutes a field. Two fields are interlaced to provide a frame. Thus, there are 525 lines per frame in accordance with the television transmission standards in the United States. The time delay may be varied over longer periods of time, for example, several frames or even longer. The time delay between the timing pulses and the sync intervals may even be varied daily or at random times. In any event, the restoring of the sync pulses depends upon the time relationship of the timing pulses and the sync intervals. Of course, one timing pulse is provided for each horizontal sync pulse. The timing pulses are therefore repetitive at the horizontal sync pulse frequency which is approximately 15.73 KHz or about every 63.56 microseconds.

In order to encode or encrypt the varying time delays, tag pulses are transmitted together with the timing pulses. These tag pulses may also be transmitted as a pulse amplitude modulation of the audio carrier of the TV signal. The dynamic delay variation is represented by the number of tag pulses in each field. In accordance with a preferred embodiment of the invention, the tag pulses which are considered to carry the encrypted information concerning the dynamic delay variation are transmitted between a first plurality of successive pairs of the timing pulses. These pairs may be provided by the first fifteen timing pulses. The tag and timing pulses are distinguished by their time relationships. The tag pulses occurring in an interval, for example, 48.4 to 51.3 microseconds after a timing pulse. It will be seen, therefore, that the tagging pulses occur during a field or a portion of a field of the TV signal, and thus during a given period of time. The variable time delay is preferably a plurality of different selectable time delays. These time delays between a timing pulse and the start of a horizontal sync interval may, for example, vary from approximately 2 microseconds to approximately 51 microseconds. Preferably, four different delays within this range may be used. The time delay relationship may be encrypted in the following manner: the transmission of a group from 0 to 3 tag pulses corresponds to a first delay; a group from 4 through 7 tag pulses in number corresponds to a second delay; a group from 8 through 11 tag pulses corresponds to a third delay; and a group consisting of from 12 to 15 tag pulses corresponds to a fourth delay. It is an important feature of the invention that a group of several successive tag pulses is used to correspond to a given delay. This provides greater noise immunity in the scrambling system than would be the case if different delays depended upon an incremental variation of a single tag pulse in the number of tag pulses transmitted. If a noise pulse is transmitted, the probability is that it will not affect the number. Thus, the selected delay variation will be retained and perturbation of the received TV picture due to noise, minimized. The tag pulses will be seen to constitute a delay control signal which is used in the descrambler 10 in order to control the restoring of the sync pulses to the sync suppressed TV signal. Reference may be had to the above-identified application of Robert 0. Banker for further information concerning the methods and means for transmitting pulses together with suppressed sync TV signals by modulating the video and audio portions of the signal so as to suppress the sync intervals in the selected time relationship with timing pulses which are transmitted. As noted above, the tag pulses are transmitted like the timing pulses, as by modulation of the audio carrier of the audio portion of the TV signal.

The subscriber is provided with a set top terminal having an up/down converter which may be used to select the desired cable channel. The selected channel is converted to an unused channel frequency, usually either Channel 3 or Channel 4, and passed through the descrambler 10 which is connected between the up/down converter and the TV set input terminals. The composite video signal is passed through a variable attenuator 12, or a variable gain amplifier. A restoring pulse generator 14 provides an output pulse for increasing the gain or decreasing the attenuation presented to the composite video signal during the sync interval, thereby restoring the sync pulses so that a standard TV signal can be applied to the TV set for display.

In order to generate the restoring pulse at the proper time, the timing and tag pulses are detected by an audio carrier demodulator 16 which extracts the audio carrier from the input TV signal as it arrives from the up/down converter. The audio carrier is amplified and filtered in an amplifier 18. The timing and tag pulses are detected by an envelope detector 20. A dynamic delay control 22 which responds to the number of tag pulses operates the restoring pulse generator 14 to produce the sync restoring pulse at the proper time depending upon the selected one of the dynamically variable time delays between the timing pulse and the sync interval. The tag pulses may separately be detected by a tag pulse detector and control system 24 when a still higher level encryption system is used which depends upon the horizontal line or lines of the field during which the tag pulses are transmitted. Such a system is described in U.S. patent application Ser. No. 06/358,135 filed Mar. 15, 1982, now U.S. Pat. No. 4,471,380 in the name of Joseph Graham Mobley and assigned to the same assignee as the present application. The tag pulse detector and control 24 may be used to enable the restoring pulse generator if the additional encryption is detected. An authorization signal generator 26 may also be used to enable the restoring pulse generator only when the subscriber is authorized to receive a selected channel and authorization data which may be derived from a memory or via an addressable computer (microprocessor) which receives channel authorizations from the head end of the cable system over the cable is transmitted to the authorization signal generator to provide the enabling signal. The channel selected by the subscriber, when the subscriber tunes the up/down converter, must be authorized before the restoring pulse generator is enabled to provide a restoring pulse for descrambling the premium program.

Figure 2:
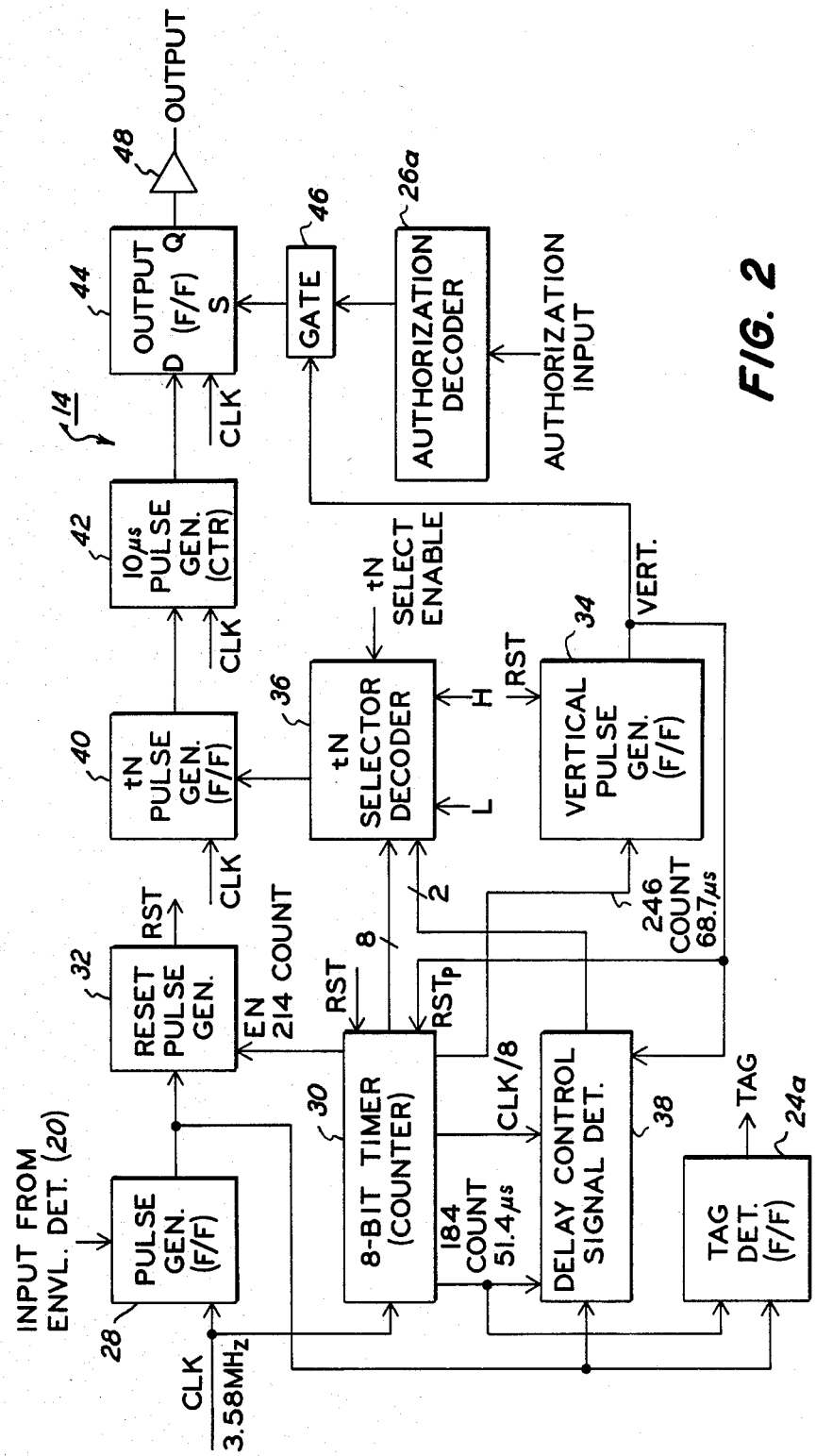
FIG. 2 is a block diagram illustrating the dynamic delay control unit of the system shown in FIG. 1 in greater detail.
Figure 3:
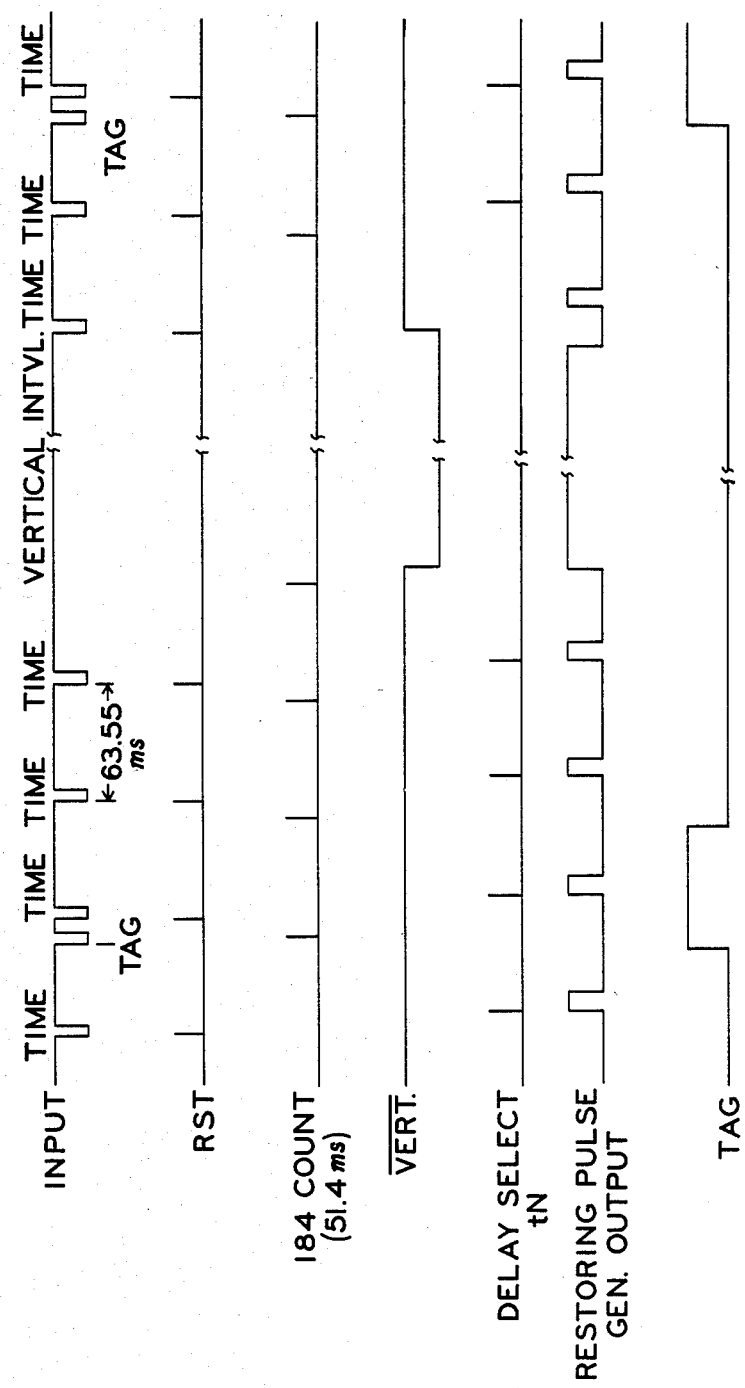
FIG. 3 is a timing diagram illustrating pulses produced during the operation of the system shown in FIG. 2.

The dynamic delay control 22 and portions of the tag pulse detector 24 and authorization signal generator 26 are illustrated in greater detail in FIG. 2. In order to minimize timing variations, the dynamic delay control 22 utilizes a crystal controlled clock pulse generator at a frequency much higher than the line rate of the TV signal to synchronize operations in the dynamic delay control 22. This clock may suitably have a frequency of 3.58 MHz. The input pulses from the envelope detector 20 are converted into short pulses, one clock period wide, coincident with an edge, for example, the leading edge which may be negative going or falling in amplitude, by a pulse generator 28, such as may be implemented by D-type flip-flops which are clocked by the clock pulses. Both the timing pulses and the tagging pulses are outputted by the pulse generator 28 as shown in the waveform of FIG. 3 marked "input". The clock is also applied to an 8 bit timer 30 which counts up to 256 clock pulses before recycling, unless reset. It may be mentioned that all of the circuits are reset on power up (when the descrambler 10 is turned on), as is conventional.

The timer 30 provides an output at various counts through the use of appropriate gating. This output includes an output when the count reaches 214 or after approximately 59.8 microseconds after reset. A reset pulse generator 32 which is enabled by the 214 count, and thus occurs after any tag pulse in the interval between successive time pulses, is triggered by an internal pulse from the pulse generator 28 which is produced by a timing pulse and produces the reset (RST) pulses. These pulses are shown in the waveform labeled "RST" in FIG. 3. The RST pulse resets the 8 bit timer 30.

A vertical pulse generator 34 identifies the vertical interval by the occurrence of a 246 count output from the timer 30. This count occurs in the absence of a timing pulse, such that the timer does not become reset in response to a succeeding timing pulse. Timing pulses are not transmitted during the vertical interval. Thus, the absence of an input timing pulse for about 68.7 microseconds sets the vertical pulse generator flip-flop to produce the VERT output. The next timing pulse results in a reset, RST, which ends the vertical interval. FIG. 3 illustrates the vertical pulse "VERT" in inverted or $\overline{\text{VERT}}$ form.

The timer 30 provides 8 output lines which represents an 8 bit or word of digital data indicative of the state of the timer and the interval after each timing pulse. It will be noted that the timing and RST pulses are about coincident and the timer 30 starts on RST. Due to the asynchronous nature of clock to timing pulse, the RST pulse may be delayed by 0 to 280 nanoseconds plus propagation delay after the timing pulse. Four selected time intervals are obtained by decoding this 8 bit output to provide delay select pulses tN. These delay select pulses are illustrated in the waveform of FIG. 3 marked "delay select tN". The tN selector 36 may be implemented by decoding gates which are operated by a 2 bit digital signal from a delay control signal detector 38. Additional levels marked L and H may also be applied to the selector 36 to enable the decoder.

A tN pulse generator 40, which may be a clocked flip-flop, generates the tN pulses. The tN pulses each operate a 10 microsecond pulse generator 42. This pulse generator may be provided by a counter which counts 36 clock pulses so as to provide a pulse sufficiently wide to overlap the horizontal sync pulses in the horizontal sync interval. An output flip-flop 44 and the pulse generator 42 provides the restoring pulse generator 14. The output flip-flop 44 is high during the 10 microsecond pulse and is also set via a gate 46 to be high during the vertical pulse from the vertical pulse generator 34. Accordingly, the restoring pulses are provided both during the horizontal and vertical intervals. These pulses are the restoring pulse generator output, and are shown in the next to bottom waveform in FIG. 3. These pulses may be applied to the variable attenuator 12 (FIG. 1) by way of a buffer amplifier 48.

The authorization decoder 26a which receives authorization input enables the gate 46 and allows the output flip-flop to pass restoring pulses during the horizontal interval. Without the authorization input the picture rolls and is distorted and therefore unacceptable to the viewer.

A tag pulse detector 24a may also be provided which is part of the tag pulse detector and control 24. The input pulses from the pulse generator 28 may be applied to the D input of a D type flip-flop providing the tag detector 24a. That flip-flop is clocked by the 184 count from the timer, since only a tag pulse will be present at the time of the 184 count the flip-flop 24a is set upon occurrence of a tag pulse. Thus, the presence of a tag pulse is represented by the state of the detector flip-flop 24a. This output indicated as TAG is shown in the bottom waveform of FIG. 3. The code represented by the occurrence of this tag pulse on a predetermined horizontal line of a field may be used to further control the generation of restoring pulses in accordance with the system described in the above-referenced Mobley application.

Figure 4:
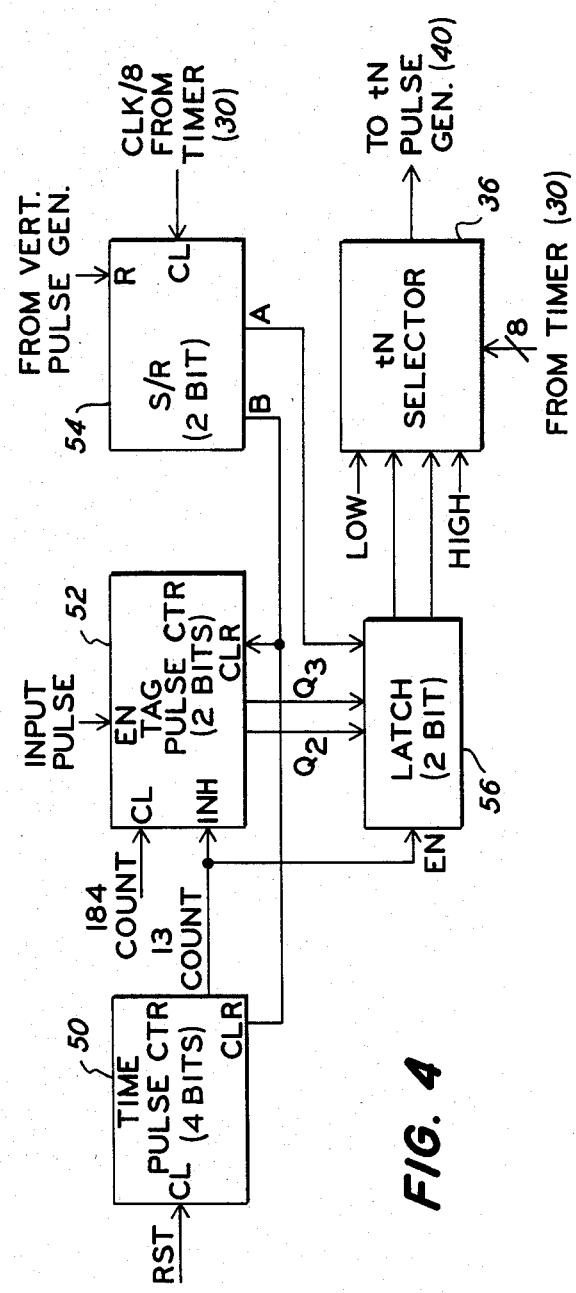
FIG. 4 is a block diagram illustrating the delay control signal detector of the delay control unit illustrated in FIG. 2.

The delay control signal detector 38 is shown, with the tN selector 36, in greater detail in FIG. 4. The detector 38 is provided by a time pulse counter 50, which may be a 4 bit counter, another 4 bit counter which provides a tag pulse counter 52, a 3 bit shift register 54 and a 2 bit latch 56. The reset pulses (RST) are used to clock the time pulse counter 50. A decoded 13 count, which corresponds to the occurrence of 13 timing pulses inhibits further reset pulses from incrementing the time pulse counter 50. The 13 count also inhibits input pulses from being counted in the tag pulse counter 52. The tag pulse counter is enabled by an input pulse and clocked whenever there is an output from the timer of 184, which as noted above, indicates the time of a tag pulse. Since the tag pulse counter 52 is inhibited by the 13 count of the time pulse counter 50, the value represented by the four bits accumulated therein can range from 0 to 12 (decimal). The two bit latch 56 stores the previous values of the two most significant bits, $Q_2$ and $Q_3$ of the tag pulse counter 52. Loading of the latch 56 is enabled by the first output (A) from the shift register 54 which is clocked by the clock divided by eight pulses from the timer 30 (FIG. 2). Accordingly, at the end of a field, the two highest order bits are stored in the latch 56. A later, nonoverlapping pulse (B) from the shift register 54 then clears the counters so as to allow the tag pulses in the succeeding field to be counted. The use of the 13 count from the time pulse counter insures that only those tag pulses which occur between the first 13 time pulses are counted. The use of the vertical pulse generator output, insures that the tag pulses counted during a preceding field is stored. The use of only the $Q_2$ and $Q$ bits provide sufficient information for the four different time delays used in the system. These four bits are presented together with low and high inputs to the tN selector 36 which decodes the eight output lines from the timer 30 to provide the tN pulses to the tN pulse generator 40. Accordingly, the dynamically variable delays represented by the tag pulses are derived from the TV signal and used to descramble the signal for only those subscribers authorized to receive the premium programming.

In order to defeat the pirating of premium sync-suppressed signals, it may be desirable to transmit from the head end of the cable system from time to time fields of said TV signals in which neither the video nor sync pulses are suppressed, but to nevertheless transmit timing pulses which are operative to restore the sync intervals. The restoring pulse generator is inhibited from generating restoring pulses in response to tag pulses which are transmitted with these timing pulses. Pirate systems which continue to provide sync restoration then cause the amplitude of the sync pulses, which are already present, to rise excessively. The AGC circuits of the TV set respond to these excessive amplitude sync signals and distort the TV picture.

Figure 5:
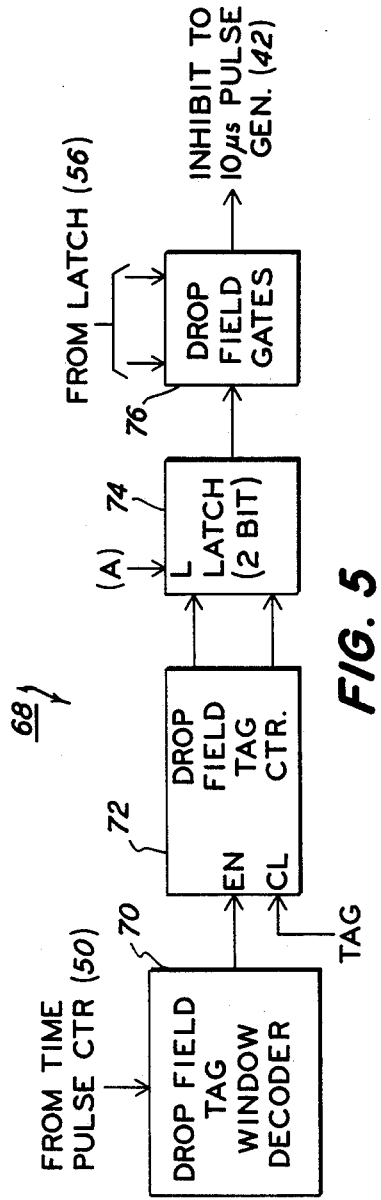
FIG. 5 is a block diagram of additional circuitry which may be used in the system to provide enhanced security against unauthorized descramblers.

FIG. 5 shows an implementation of such a piracy defeating circuit 68. The time pulse counter output is decoded in a drop field tag window decoder 70 which established a time window between the 14th and 16th timing pulses. Tag pulses which occur during the window are counted in a drop field tag counter 72. If two such pulses occur, the circuit operates to drop the field. The two bit count is latched upon occurrence of the (A) output from the shift register 54 (FIG. 4) in a latch 74. When a certain time delay code is detected, as represented by the value of the 2 bit code stored in the latch 56 (FIG. 4), drop field gates 76 are enabled to apply an inhibit level to the 10 microsecond pulse generator 42 (FIG. 2) during the field. The pirate descrambler is not inhibited and amplifies the sync pulses already of full amplitude, thereby distorting the TV picture.

From the foregoing description it will be apparent that there has been provided an improved system for sync suppression scrambling. While a presently preferred embodiment of the system has been described, variations and modifications thereof within the scope of the invention, will undoubtedly suggest themselves to those skilled in the art. Accordingly, the foregoing description should be taken as illustrative and not in a limiting sense.

I claim:

1. In a sync suppression scrambling system in which TV signals are transmitted with sync pulses thereof suppressed, together with timing pulses having a dynamically variable time delay relationship with said sync pulses and together with delay control pulses which represent said time relationship, descrambling apparatus which comprises means for restoring said suppressed sync pulses of said TV signal with restoring pulses, and means for operating said restoring means to generate said restoring pulses in different time relationships with said timing pulses depending upon the number of said delay control pulses which are detected in a given period of time.

2. The invention according to claim 1 wherein said time relationship consists of a certain number of different time delays, and said operating means comprises means responsive to a plurality of said delay control pulses greater than said certain number of time delays for selecting different ones of said different time delays each for a successively larger number of said plurality of delay control pulses which are detected.

3. The invention as set forth in claim 1 wherein said operating means includes means for detecting the number of said delay control pulses which occur during each field of said TV signal, the duration of each said field being said given period of time.

4. The invention as set forth in claim 3 wherein said detecting means includes means for detecting the number of said delay control pulses between a plurality of successive pairs of said timing pulses which occur at the beginning of each field of said TV signal, the duration from the beginning of each said field until the last delay control pulses of said successive pairs thereof being said given period of time.

5. The invention as set forth in claim 1 wherein said delay control pulses are tag pulses which follow at least a plurality of said timing pulses, and wherein said operating means comprises delay control signal detecting means for providing a digital signal representing said number of tag pulses occurring within said given period of time, means for generating a plurality of output pulses each occurring at a different interval of time after each of said timing pulses, and means operated by said digital signal for selecting certain ones of said output pulses having a time relationship with said timing pulses corresponding to the value of said digital signal, and means for timing the generation of said restoring pulses with said selected ones of said output pulses.

6. The invention as set forth in claim 5 wherein said digital signal generating means comprises means for translating said number of tag pulses into a digital signal having a plurality of values, each corresponding to a different successively larger group of said tag pulses.

7. The invention as set forth in claim 5 wherein said delay control signal detecting means includes means for counting said tag pulses during a field of said TV signal to provide said digital signal, and means for storing said digital signal provided by said counting means.

8. The invention as set forth in claim 7 wherein said counting means is a multi-bit counter, and including means for transferring less than all of said bits accumulated in said counter to said storing means, and means for converting said bits in said storing means into said digital signal with a certain number of different values corresponding to different groups of said tag pulses at least one of which groups corresponds to a plurality of successive tag pulses, whereby said selecting means is operative to select a certain number of different ones of said output pulses each corresponding to a different one of said certain number of values of said stored digital signal.

9. The invention as set forth in claim 7 further comprising means for enabling said tag pulse counter means to count tag pulses which occurred during the interval of a certain number of timing pulses during each of said fields.

10. The invention according to claim 8 further comprising another multi-bit counter for counting said timing pulses and providing an output for inhibiting said tag pulse counter after a certain number of timing pulses are counted.

11. The invention as set forth in claim 10 further comprising means for enabling transfer of said bits and said tag pulse counter to said storing means when said certain number of timing pulses is counted in said timing pulse counter, means operative during the vertical sync interval of said TV signal for first transferring said bits from said tag pulse counter to said storing means and then clearing said timing and tag pulse counters.

12. The invention as set forth in claim 1 further comprising means for inhibiting the operation of said restoring means upon occurrence of a plurality of said control pulses which occur after said period whereby to defeat unauthorized restoring means.

* * * * *